Oct. 13, 1936.　　　F. N. BARD　　　2,057,130
TRAIN PIPE CONNECTION
Filed Jan. 25, 1934
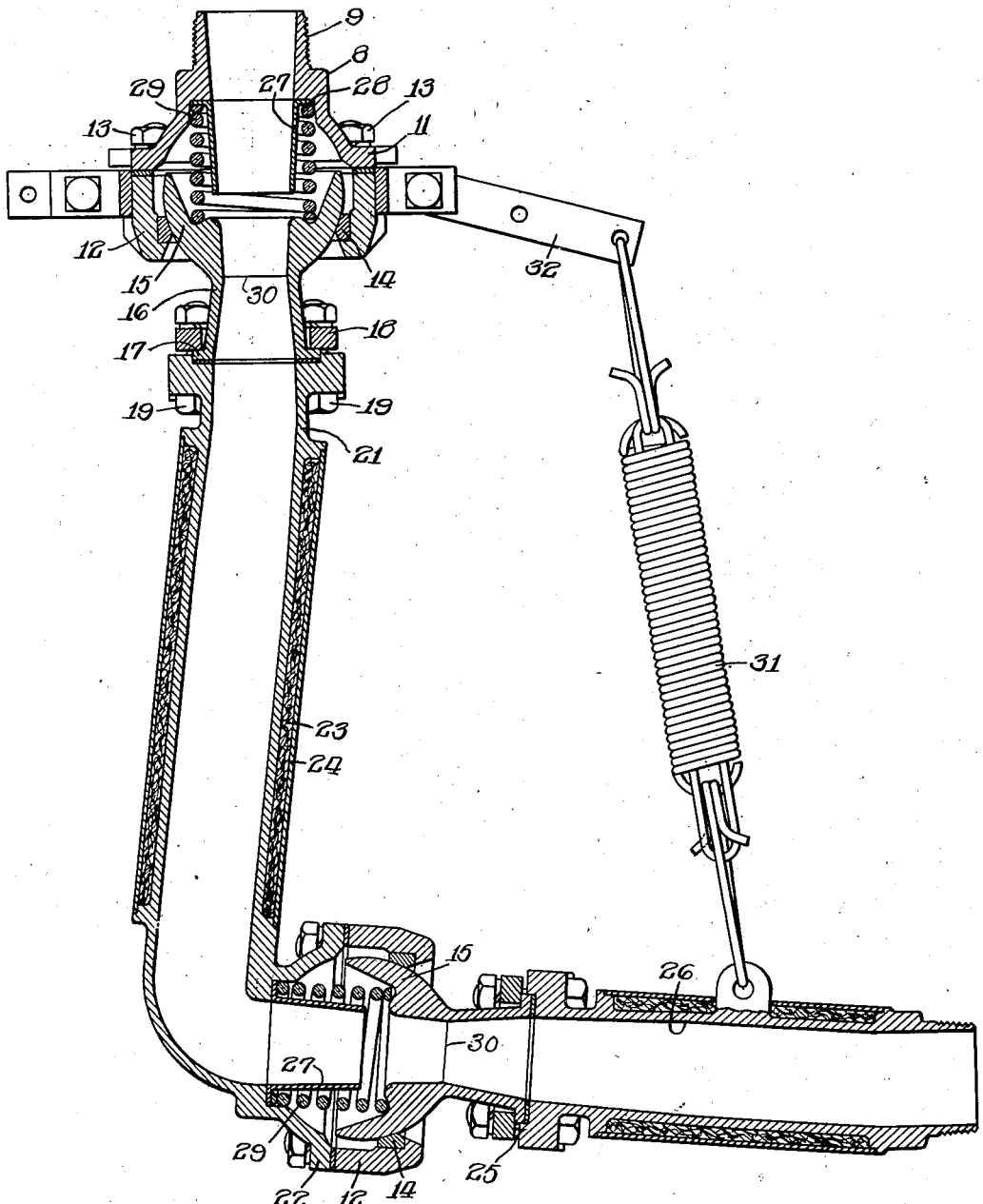
Inventor:
Francis N. Bard,
By Ira J. Wilson  Atty.

Patented Oct. 13, 1936

2,057,130

UNITED STATES PATENT OFFICE 2,057,130

TRAIN PIPE CONNECTION

Francis N. Bard, Highland Park, Ill., assignor to Barco Manufacturing Co., Chicago, Ill., a corporation of Illinois Application January 25, 1934, Serial No. 708,200

5 Claims. (Cl. 285—94)

This invention relates in general to flexible pipe connections and is herein described as it may be utilized in train pipe connections employed for establishing connection between the steam or air lines of the coupled cars of a railway train.

This patent application constitutes a continuation in part of and also discloses an improvement upon copending application, Serial No. 595,478, filed February 27, 1932.

Train pipe connections of this general character, in order to obviate breakage and disruption of the parts, must afford sufficient flexibility and extensibility to take care of the maximum separation of the connected cars as well as their closest approach to each other.

In the effort to attain adequate flexibility the over-all size of the flexible connections must be held within certain reasonable limits despite the desirability of increasing their size in order to minimize the flow resistance that inheres in sharp bends and flexible joint passages which may be smaller than the average train supply pipe sizes. The length of the vertically hanging pipe portions of these flexible connections is limited by the necessity of maintaining a clearance of five inches above the rails. The lower flexible joint, in a connection of the general character shown in the drawing, cannot be increased in over-all size to give it a desirable greater flow capacity without shortening the vertical pipe to maintain the required rail clearance. Shortening of any of the pipe lengths is undesirable as it decreases extensibility of the entire connection.

Therefore, this invention provides improvements in flexible pipe connections which facilitate the use of long pipe lengths and flexible joints of small over-all size, without sacrifice of flow capacity of the units.

This application discloses one embodiment of the invention which has been selected for illustrative purposes and which employs ball and socket joints in order to attain the flexibility desired. The extent of flexibility of such a joint is limited necessarily to the angle at which the ball neck strikes the socket casing. It will be perceived by reference to the accompanying drawing that the extent of swinging movement of the ball neck relatively to the casing may be increased by reducing the outside diameter of the neck where it may contact with the socket casing. However, the smaller the diameter of this neck the smaller must be the air or steam passage through it. In this invention the small ball neck is utilized and the device is so constructed that the smaller passages thereby provided do not, however, result in any serious loss in fluid pressure. The manner in which these and other advantages are attained will now be described with reference to the drawing.

The single figure of the drawing is a central sectional view through the device.

Referring now to the drawing more in detail, reference character 8 indicates generally the top male casing of the connection which has provisions in the form of screw threads 9 for connection to the car end valve in the usual manner. This casing is shaped at its lower end as indicated at 11 to form the upper section of a ball joint casing, the remainder of the casing being formed by the angle casing cap 12 which is detachably secured to the member 8 by a plurality of bolts 13. A joint gasket 14 assists the casing cap to retain the ball member 15, and at the same time forms a seal around the ball member. Integral with the ball member is an outwardly projecting neck 16 which is adapted to swing within the limits of the opening in the casing cap 12 through which it projects.

The outer end of the neck is provided with a flange 17 by which, through the intermediary of a split flange 18 and detachable bolts 19, the neck is rigidly but detachably connected with the angle casing or conduit member 21. The lower end of this member is of elbow shape and terminates in an expanded portion 22 forming a section of the joint casing for the horizontal joint which is substantially similar in all material respects to the joint above described. The conduit member 21 is provided with suitable insulation 23 surrounded by a shell 24, all as disclosed and claimed in said copending application, Serial No. 595,478.

A detailed description of the horizontal lower joint and its connection to the flange 25 of the horizontal conduit member 26 are unnecessary to an understanding of my present invention and will not be repeated here. It will be sufficient to observe that the same advantages are attained in the lower joint as exist in the upper, and by the same means.

It will be observed that the passage through the threaded portion of the top casing member 8 is tapered inwardly or reduced in diameter from its upper end to its point of communication with the interior of the casing and to continue this tapered passage so as to afford the most efficient fluid flow in both directions, I have provided a thimble member 27 having a base flange 28 seated in the upper end of the casing proper, both the thimble and the ball member being retained in operative positions by a coiled joint spring 29 interposed between the flange 28 and the seat formed in the ball member. The thimble member forming a continuation of the passage is likewise tapered throughout its length, its minimum diameter being at the lower end where it communicates with the interior of the casing. A similar thimble 27 is provided in the lower joint.

Each ball member has an internal recess of frusto-conical shape in the bottom of which the spring 29 is seated. This outward flare of the body of the ball permits free swinging of the ball relative to its spring which insures constant seating and sealing of the ball against its gasket. The shape of the thimble insures against interference with the normal functions of the spring 29.

The safety spring 31 and its support 32 may be of any well known or preferred construction.

The attainment of maximum swinging movements of the ball in its socket necessitates a reduced external diameter of the ball neck at its juncture with the ball. This unavoidable limitation on the size of the neck necessarily restricts the size of the passage through the neck and heretofore has resulted in flow reduction and pressure loss in the fluid flowing therethrough. In order to minimize this reduction my invention contemplates the employment of a Venturi action. From the maximum constriction at the line 30 the passage is accordingly gradually tapered outwardly in both directions to form a venturi through which the fluid will flow with a minimum of loss in volume and without serious pressure loss.

My invention therefore permits maximum flexibility of the connection and also maximum fluid flow with a minimum pressure loss. The advantages of the ball and ball neck structure per se may be utilized to a large degree without the employment of the tapered thimble, but the thimble, by directing the flow in one direction into the passage of the ball and by reducing eddy currents and providing for a gradual expansion of the stream when flowing in the opposite direction, adds to the efficiency of the connection.

The structural details illustrated and described may obviously be varied within considerable limits without departing from the spirit of my invention as defined in the following claims.

I claim:

1. In a flexible pipe connection, a flexible joint comprising a ball and socket, the socket having an inlet passage and a tapered thimble extending inwardly therefrom together forming a continuous passage of gradually diminishing taper toward the interior of the socket, said ball being hollow and having a hollow neck protruding from said socket, said neck being exteriorly and interiorly constricted where it contacts the casing when in extreme angular position, the passage through said ball and neck being tapered outwardly from said constriction in both directions.

2. In a pipe connection, a flexible joint comprising a socket casing having a passage of gradually diminishing taper toward the interior, a hollow ball and neck element associated with said casing, the neck protruding from the casing, said element being constricted within the contact zone between the neck and the casing when said element assumes its extreme angular position, the passage through the ball and neck having a gradually expanding taper extending in both directions from said constriction, a spring seated in said casing and pressing against the ball on a circular area inside of the outer surface of the ball and immediately outside of the passage therethrough, and a thimble in said socket casing positioned within said spring registering with said passage of the casing and diminishingly tapered toward the passage through said ball.

3. A flexible pipe connection including a flexible joint comprising a ball joint casing adapted for connection with a pipe and a hollow ball member mounted for universal movement within said casing and provided with a hollow neck projecting through an opening in the casing and constructed for connection with a pipe, the passage through said ball and neck being shaped to provide a venturi adapted to permit fluid flow therethrough in either direction without substantial pressure loss having the throat thereof located at the juncture of said ball and neck and in the plane of the zone of contact between said neck and casing when the neck is in extreme angular position, said neck being of minimum external diameter within said zone to permit maximum swinging movements of said neck.

4. A flexible pipe connection including a flexible joint comprising a ball joint casing and a hollow ball member mounted for universal movement therein and provided with a hollow neck projecting therefrom, said neck being externally and internally tapered inwardly toward its juncture with said ball member and the passage through the ball member being tapered toward said juncture, whereby to form a venturi-shaped passage through the ball and neck permitting fluid flow therethrough without substantial pressure loss, the smallest external diameter of said neck being located to contact with the casing when the neck is swung to extreme angular position, to thereby permit maximum swinging movement of said neck relative to said casing.

5. A flexible pipe connection comprising a ball joint casing, a hollow ball member mounted for universal movement therein and provided with a hollow neck projecting therefrom, the exterior of the neck being constricted in the area of contact with the casing when in extreme angular position to permit maximum angular movements of the neck relatively to the casing, and the passage through the ball and neck being internally constricted in the plane of such surrounding external constriction and tapered outwardly therefrom in both directions to facilitate fluid flow therethrough without substantial pressure loss.

FRANCIS N. BARD.